United States Patent
Gai et al.

(10) Patent No.: US 7,567,510 B2
(45) Date of Patent: Jul. 28, 2009

(54) SECURITY GROUPS

(75) Inventors: Silvano Gai, San Jose, CA (US);
Thomas James Edsall, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1036 days.

(21) Appl. No.: 10/367,341

(22) Filed: Feb. 13, 2003

(65) Prior Publication Data

US 2004/0160903 A1    Aug. 19, 2004

(51) Int. Cl.
*H04L 12/22* (2006.01)

(52) U.S. Cl. .................. 370/230; 370/235; 370/465; 726/27

(58) Field of Classification Search ............. 370/229, 370/230, 230.1, 235, 352, 353, 465, 469; 709/217–219, 227–229; 726/26–30; 713/153, 713/154, 160, 161

See application file for complete search history.

(56) References Cited

U.S. PATENT DOCUMENTS

| | | | |
|---|---|---|---|
| 5,742,604 A | 4/1998 | Edsall et al. | 370/85 |
| 5,978,378 A * | 11/1999 | Van Seters et al. | 370/401 |
| 2002/0146026 A1* | 10/2002 | Unitt et al. | 370/428 |
| 2002/0163920 A1* | 11/2002 | Walker et al. | 370/401 |
| 2003/0117998 A1* | 6/2003 | Sala et al. | 370/351 |
| 2003/0235191 A1* | 12/2003 | Heggarty et al. | 370/389 |
| 2004/0047300 A1* | 3/2004 | Enomoto et al. | 370/256 |

FOREIGN PATENT DOCUMENTS

| | | | |
|---|---|---|---|
| EP | 924900 A2 | * | 6/1999 |
| WO | WO99/56436 | | 11/1999 |
| WO | WO00/78004 | | 12/2000 |
| WO | WO02/19585 | | 3/2002 |
| WO | WO 2004013986 A1 | * | 2/2004 |

OTHER PUBLICATIONS

Ishibashi, H et al., "A Protection Method Against Unauthorized Access and Address Spoofing for Open Network Access Systems," IEEE Pacific Rim Conference on Communications, Computers and Signal Processing, 2001. PACRIM 2001. Aug. 26-28, 2001. vol. 1. pp. 10-13.*

(Continued)

*Primary Examiner*—Donald L Mills
(74) *Attorney, Agent, or Firm*—Weaver Austin Villeneuve & Sampson LLP

(57) ABSTRACT

Methods and devices are provided for implementing security groups in an enterprise network. The security groups include first network nodes that are subject to rules governing communications between the first network nodes and second network nodes. An indicator, referred to as a security group tag (SGT), identifies members of a security group. In some embodiments, the SGT is provided in a field of a data packet reserved for layer 3 information or a field reserved for higher layers. However, in other embodiments, the SGT is provided in a field reserved for layer 1 or layer 2. In some embodiments, the SGT is not provided in a field used by interswitch links or other network fabric devices for the purpose of making forwarding decisions.

51 Claims, 11 Drawing Sheets

OTHER PUBLICATIONS

S. Kent, "U.S. Department of Defense Security Options for the Internet Protocol", BBN Communications, Nov. 1991, RFC 1108, pp. 1-17.

Haigh, Tom, "Virtual Enterprises and the Enterprise Security Architecture," Secure Computing Corp., IEEE 1995, pp. 53-64.

U.S. Office Action mailed Sep. 10, 2007, from U.S. Appl. No. 10/791,297.

Ishibashi, H. et al., "A Protection Method Against Unauthorized Access and Address Spoofing for Open Network Access Systems," IEEE Pacific Rim Conference on Communications, Computers and Signal Processing, 2001. PACRIM 2001. Aug. 26-28, 2001. vol. 1, pp. 10-13.

International Search Report, mailed Jul. 6, 2004 from International Application No. PCT/US2004/002771, 5 pp., including Notification of Transmittal.

Written Opinion of the International Searching Authority, mailed Jul. 6, 2004 from International Application No. PCT/US2004/002771, 6 pp.

First Examiner's Report mailed Jun. 19, 2008, from Australian Patent Application No. 2004214281, 2 pp.

International Preliminary Report on Patentability dated Jan. 18, 2005, from International Application No. PCT/US2004/002771, 7 pp.

First Chinese Office Action issued Sep. 12, 2008, from Chinese Patent Application No. 200480004038.0, 20 pp. (in Chinese, with English translation).

First Chinese Office Action issued Sep. 12, 2008, from Chinese Patent Application No. 2004/80004038.0, 17 pp. (in Chinese, with English translation).

* cited by examiner

SECURITY GROUPS

BACKGROUND OF THE INVENTION

The present invention relates to private networks such as enterprise networks. In particular, the invention relates to methods and devices for creating subgroups within private networks.

There is a need for internal grouping of network nodes within private networks. Grouping network nodes may be necessary to enforce internal security, to provide certain groups with higher quality of service, or otherwise to distinguish certain classes of users. For example, grouping network nodes can allow only finance group employees to view data available from a financial server and allow only engineering group employees to view data available from an engineering server. Grouping network nodes can provide higher quality of service to users working on important or data-intensive projects. Alternatively, grouping network nodes can allow employees to access all resources on a network, while restricting guests logging in from the Internet to a subset of the available resources.

Under some conditions, virtual subsets of network nodes within local area networks (sometimes referred to as VLANs) serve this need for internal separation of network nodes. VLANs can segregate traffic in a local area network by dedicating different VLANs to different purposes. As set forth in detail in U.S. Pat. No. 5,742,604 at col. 5, line 1 through col. 7, line 44 and FIGS. 3-6, which are incorporated herein by reference, VLANs were implemented using a VLAN identifier or "tag" in the layer 2 frame header, while leaving other layers of a packet unchanged. This tag is used to make switching decisions at a packet level equivalent to layer 2 of the Open System Interconnection (OSI) reference model. Although prior art VLAN tags are numerical codes, they are described, for simplicity, in terms of colors, presumably based on the custom of color-coding physical files. For example a "red" VLAN tag may be used for engineering, a "blue" VLAN tag may be used for marketing and a "yellow" VLAN tag may be used for finance.

VLANs are currently being used only in a local environment (e.g., inside a building). The backbone of such networks is routed based on an equivalent to layer 3 of the ISO reference model, such as the Internet protocol (IP) layer of the TCP/IP protocol or the FC-4 layer of the Fiber Channel protocol. Consequently, the routers in the network's backbone may not propagate the layer 2 VLAN tagging. Therefore, the capability of traffic segregation using VLAN tags is lost when packets are sent over such a backbone. If the routers in such a network do propagate the layer 2 VLAN tagging and the tags are transmitted to another network, various difficulties may result. For example, a code which defines an engineering VLAN in one local environment will probably not be the same code which defines an engineering VLAN in another local environment.

SUMMARY OF THE INVENTION

Methods and devices are provided for implementing security groups in an enterprise network. These security groups provide access control and traffic segregation in computer networks, regardless of the network topology or bridging/routing control protocols.

According to some aspects of the invention, a Security Group Tag (SGT) is inserted in the packet at an ingress port of the network and the SGT is checked for traffic segregation at an egress port of the network. The SGT may be inserted in the packet in conjunction with a security header. Preferably, authentication information is also added to the packet. Some or all of the packets, including the SGT, may also be encrypted before transmission by a first router and decrypted after receipt by a second router of the network. In preferred embodiments, forwarding the packet between the ingress and the egress ports is completely independent of the SGT. Accordingly, an SGT may be used on a layer 3 routed network, including the Internet.

According to some preferred embodiments, what goes in the packet, i.e. the SGT may be considered a "source group" because the tag represents a set of sources. The network device that does the egress check combines the information of the SGT (i.e. which group of sources) and of the destination to select a policy to be applied to a packet. The policy is applied inside the egress network device and may be implemented by an access control list ("ACL"). According to some aspects of the invention, the SGT is checked at the port level of an egress network device against a very simple data structure (e.g., an array of bits) to determine whether to discard the packet or allow the packet to reach its intended destination.

According to some aspects of the invention, an egress network device concatenates together the SGT and the destination address and selects a policy to be applied to the packet. In some such aspects of the invention, the policy is an ACL that can test additional fields, for example protocol fields. For example, the policy may allow only Web traffic.

According to some aspects of the invention, a method is provided for implementing a security group within a network. The method includes the following steps: receiving a packet; classifying the packet as having a security group designation selected from a plurality of security group designations, the security group designation associating a set of destinations and a set of sources authorized to access the set of destinations; and applying a security group tag to the packet which identifies the security group designation, the security group tag being applied in a field not reserved for virtual local area network information. The security group tag may be applied in a field reserved for layer one or in a field reserved for layer two.

According to some aspects of the invention, a method is provided for implementing a security group within a network. The method includes the following steps: receiving a packet; classifying the packet as having a security group designation selected from a plurality of security group designations, the security group designation associating a set of destinations and a set of sources authorized to access the set of destinations; and applying a security group tag to the packet which identifies the security group designation, the security group tag being applied in a field reserved for security group information. The security group tag may be applied in a field reserved for layer one or in a field reserved for layer two.

According to other aspects of the invention, a method is provided for implementing a security group within a network. The method includes the following steps: receiving a first packet; classifying the first packet as having a first security group designation selected from a plurality of security group designations, wherein the first security group designation associates a first set of destinations and a first set of sources authorized to access the first set of destinations; and applying a first security group tag to the first packet which identifies the first security group designation, wherein the first security group tag is applied in a field reserved for layer three or higher and wherein the information in the field is not used in forwarding decisions by interswitch links. According to some such methods, a layer two security group tag is applied in a field reserved for layer two. According to some such methods, authentication information is provided in the first packet. The first security group tag may be encrypted.

Some such methods also include the following steps: receiving a second packet; classifying the second packet as having a second security group designation selected from the plurality of security group designations, wherein the second security group associates a second set of destinations and a second set of sources authorized to access the second set of destinations; and applying a second security group tag to the packet which identifies the second security group designation. The second set of sources can include a source that is a member of the first set of sources. The second set of destinations can include a destination that is a member of the first set of destinations. The packet may be received directly from a source node. The packet may be classified based on source identity or payload content. The source identity may include a user identity.

Other methods of this kind include the following steps: (a) receiving a second packet having a second security group tag identifying a particular security group within the enterprise network, wherein the second security group tag is provided in a field of the packet containing layer 3 or higher information, and wherein the field is not used in forwarding decisions by interswitch links; (b) based on the security group identified in the second security group tag, determining whether to transmit the second packet to its intended destination; and (c) transmitting the second packet or denying transmission of the second packet to the intended destination based on the determination in (b).

According to some embodiments of the invention, an apparatus is provided for implementing a security group within a network. The apparatus includes: a port for receiving a first packet; a processor for classifying the first packet as having a first security group designation selected from a plurality of security group designations, wherein the first security group designation associates a first set of destinations and a first set of sources authorized to access the first set of destinations; and an encoder for applying a first security group tag to the first packet which identifies the first security group designation, wherein the first security group tag is applied in a field reserved for layer three or higher. According to some embodiments of the invention, the first security group tag is not used in forwarding decisions by interswitch links. According to some embodiments of the invention, the encoder applies a layer two security group tag in a field reserved for layer two. According to other embodiments of the invention, the encoder applies a layer one security group tag in a field reserved for layer one.

According to some aspects of the invention, a method is provided for implementing a security group within a network. The method includes the following steps: receiving a packet; verifying a source of the packet; reading a destination address of the packet; reading a security group tag in a field of the packet reserved for layer three or higher; determining a first security group of the packet based on the security group tag, wherein the first security group is one of a plurality of security groups and wherein the first security group associates a first set of destination addresses and a first set of sources authorized to access the first set of destination addresses; and deciding, based upon the source and the first security group designation, whether to transmit the packet to the destination address.

The source of the packet can be verified by analyzing authentication information in the packet, thereby authenticating a source and/or a user. The method may include the step of decrypting the packet. The first security group may be a closed group or an overlapping group.

The method may also include the following steps: receiving a second packet; classifying the second packet as having a second security group designation selected from a plurality of security group designations, wherein the second security group designation associates a second set of destinations and a second set of sources authorized to access the second set of destinations; and applying a second security group tag to the second packet which identifies the second security group designation, wherein the second security group tag is applied in a field reserved for layer three or higher and wherein the information in the field is not used in forwarding decisions.

According to still other embodiments of the invention, an apparatus is provided for implementing a security group within a network. The apparatus includes a port for receiving a packet. The apparatus also includes a processor for: verifying a source of the packet; reading a destination address of the packet; reading a security group tag in a field of the packet reserved for layer three or higher; determining a first security group of the packet based on the security group tag, wherein the first security group is one of a plurality of security groups and wherein the first security group associates a first set of destination addresses and a first set of sources authorized to access the first set of destination addresses and deciding, based upon the source and the first security group designation, whether to transmit the packet to the destination address.

According to further aspects of the invention, a method is provided for implementing a security group within an enterprise network having a plurality of security groups, wherein the security groups each include multiple network nodes within the enterprise network, and wherein the network nodes within a security group are subject to rules governing which network nodes they can communicate with. The method includes the following steps: (a) receiving a packet having a security group tag identifying a particular security group within the enterprise network, wherein the security group tag is provided in a field of the packet containing layer 3 or higher information, and wherein the field is not used in forwarding decisions; (b) based on the security group identified in the security group tag, determining whether to transmit the packet to its intended destination; and (c) transmitting the packet or denying transmission of the packet to the intended destination based on the determination in (b).

Another aspect of the invention pertains to computer program products and/or apparatus including machine-readable media, including processors, on which are provided program instructions and data for implementing at least some portion of the methods described above. Any of the methods of this invention may be represented, in whole or in part, as program instructions that can be provided on such computer readable media. In addition, the invention pertains to various combinations of data, data structures, packet formats, etc. generated and/or used as described herein.

DEFINITIONS

Figure 1:
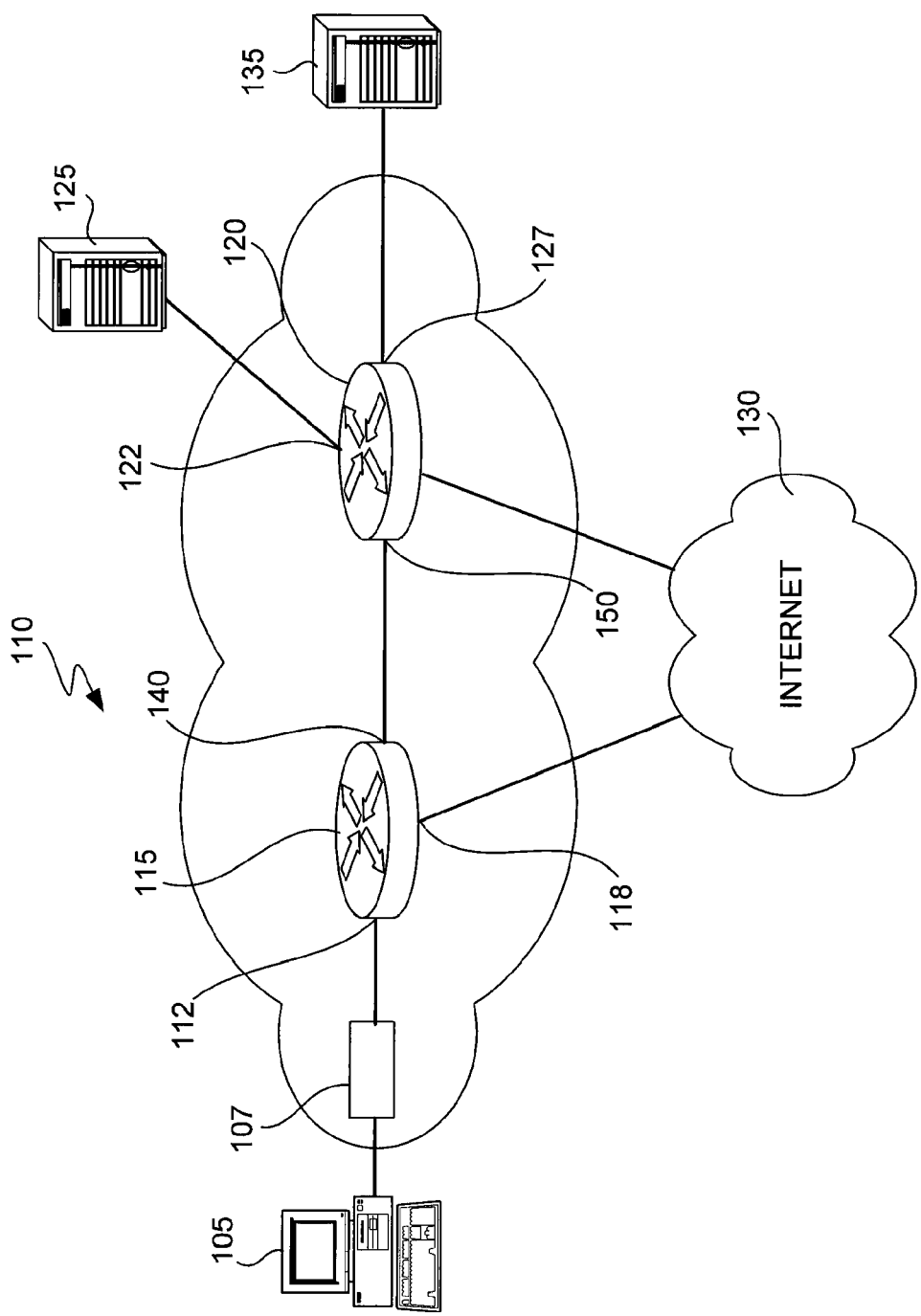
FIG. 1 depicts a host connected to an enterprise network and to the Internet.

Host/Router: As used herein, the term "host" means a source or destination device within an enterprise network, such as a conventional host (a personal computer, a user terminal, etc.), a server, a memory storage device, etc. Hosts differ from "routers," which convey packets between hosts. As used herein, the term "router" means any such device, including but not limited to a true router, a switch, a bridge, an intermediate system, or a wireless access point. In some cases, when an enterprise network is connected to the Internet or some other public network, the entire public network is collectively treated as a single host/router.

Ingress/Egress: When a packet is sent from a host to a router that forms an edge of a "cloud" of routers that supports security groups, the packet is said to "ingress" the cloud. In some embodiments of the present invention, an ingress router will apply a security group tag to a packet from a host that is ingressing the cloud and then transmit the packet to another router. In other embodiments of the invention, a host may add a security group tag to a packet. A host with such a capability is considered to be within the cloud. Conversely, when a packet is sent from a router on the edge of the cloud to a host, the packet is said to "egress" the cloud.

Enterprise network: An enterprise network is a network controlled by an "enterprise," which may be a public entity, a private organization such as a company, etc. An enterprise network typically includes at least one local area network (LAN) or a group of LANs, possibly distributed over a campus or multiple sites. Some terms that have been applied to specific types of enterprise networks include Metropolitan Area Networks (MANs), which cover a group of nearby corporate offices or a city and Wide Area Networks (WANs), which span a larger geographical area. In some cases, an enterprise network includes two or more geographically separated sites connected in some manner such as by a leased line (e.g., a T1 line), a Virtual Private Network (VPN) tunnel, etc. The Internet is not an enterprise network, but may be used to link parts of an enterprise network. For example, VPN may be realized using the Internet.

In many implementations of importance to this invention, the enterprise network forwards packets via protocols at layer 3 (e.g., the network layer of the TCP/IP protocol) or higher layers (e.g., the transport layer of the TCP/IP protocol). Hence, the fabric of the enterprise network typically comprises routers as opposed to switches, which forward packets on the basis of layer 2 information. However, some aspects of the invention include placing security group tags in fields reserved for layer 2 or layer 1.

Packet/Frame: A packet is a unit of data that is routed between an origin host and a destination host on the Internet or any other packet-switched network. Each packet includes the address of the destination host. The term "frame" is generally understood either to mean a logical grouping of information sent as a data link layer unit over a transmission medium, or to mean the header and the trailer, used for synchronization and error control, that surround the user data contained in the unit. The term "frame" is typically used to indicate a layer 2 entity, whereas the term "packet" is typically used to describe a corresponding entity at layer 3 or above. However, the terms "packet" and "frame" will be used interchangeably herein.

Security group: A security group is a subgroup of network entities within an enterprise network. The network entities are permitted to communicate among themselves, from a security standpoint, subject to certain policies. Typically, an enterprise network will contain at least two distinct security groups. The members of any given security group cannot necessarily communicate with members of a different security group. Some network entities may belong to multiple security groups, as is the case with "overlapping" security groups. The enterprise network entities available for membership in security groups are typically hosts and users, as opposed to routers. In alternative embodiments, however, some or all of the routers in the enterprise network are constrained to carry only traffic for a subset of the security groups in the network.

DETAILED DESCRIPTION OF THE INVENTION

In accordance with some aspects of this invention, each packet is classified at the ingress of the network as belonging to a security group, the classification is written in the SGT field of packet and it is carried with the packet over the network. The SGT/tag may take many forms. According to some aspects of the invention, the tag is provided in a field within the packet header section provided for layer 3 information or another header section provided for even higher layer information. However, in a layer 2 network the SGT may be embedded in the layer 2 header. Moreover, the SGT may be disposed in other fields reserved for layer 1 or layer 2 information, provided that the fields are not assigned to another purpose. For example, disposing an SGT in the same field that a VLAN would be encoded may cause difficulties.

According to some aspects of the invention, the SGT is not provided in a field used by routers or network fabric devices for the purpose of making forwarding decisions. Hence, such SGTs are independent of forwarding considerations. Note that "forwarding," as used herein, entails selection of a particular neighboring network device for hops between routers.

FIG. 1 illustrates a portion of a network which will be used to describe examples of implementing a security group using an SGT. There may be many other hosts within enterprise network 110, but for the sake of simplicity only host 105 and servers 125 and 135 are shown in FIG. 1. Host 105 is a member of a security group within enterprise network 110. Routers 115 and 120 are routers of enterprise network 110. When host 105 sends packet 107 to destinations within enterprise network 110 or Internet 130, an SGT is added to packet 107 at ingress port 112 of router 115. In this example, the SGT is for security group 1, the members of which are authorized to access server 125 or Internet 130, but not server 135.

At least a portion of packet 107 that includes the SGT may be encrypted. The encryption may be performed using any viable method know to those of skill in the art, such as secret key or public key cryptography. With secret key cryptography, both sender and recipient use the same key, which is randomly chosen for each session. Public key cryptography uses both a public key, which is published for all users, and a private key. Each recipient has a confidential private key, which the sender uses to encrypt the transmitted data. Secret key cryptography has the advantage of being less computation-intensive and therefore faster than public key cryptography, but it requires the keys to be changed periodically.

In some preferred embodiments, a cryptographic technique is used for data origin authentication, anti-reply and/or integrity protection purposes. For example, the sender may compute a cryptographic signature of the packet and include it into the packet itself. The receiver will perform a cryptographic check of the signature and determine whether the packet is authentic or if it has been tampered with. Alternatively, the authentication process may be performed by using any authentication technique known by those of skill in the art.

In a first example, host 105 sends packet 107 to server 125, e.g., to request information stored on server 125. Authentication information is added to packet 107 and the packet is encrypted at port 140. Then, packet 107 is forwarded from router 115 to router 120 based upon information encoded in layer 3 of packet 107, but not upon the SGT. Packet 107 is decrypted at port 150 of router 120 and the SGT is checked at egress port 122 to determine whether packet 107 is authorized to reach server 125. Because the SGT of packet 107 indicates security group 1, the members of which are allowed to send packets to server 125, packet 107 is transmitted to server 125.

In alternative embodiments, the SGT and/or authentication information is added or evaluated by different components. For example, the SGT may be evaluated at port 150 of router 120. Alternatively, hosts may actively participate in a security system according to some embodiments of the present invention. In some such embodiments, host 105 may add authentication information to packet 107. In some embodiments, server 125 may decrypt packet 107. If hosts are not able to decrypt packets and/or process SGTs, it is preferable that packets which egress the network are "plain vanilla" packets without SGTs or encryption.

The above-described egress testing may be implemented by software, by hardware, or on some combination of the two. In some embodiments, egress testing is performed using ACLs (Access Control Lists). An ACL is composed of one or more ACEs (Access Control Entries). When an ACL is evaluated, its ACEs are examined in order to determine if they match the contents of a packet. Each ACE has this format: if condition then action. A "condition" must be satisfied by information contained in one or more fields in the packet (the SGT being a possible field). An "action" is typically to permit or deny. In this example, the action would be to permit or deny the packet's access to server 125 as a function of the SGT contained in the packet. However, other actions are possible, such as logging.

While it is possible to mix ACEs with actions of permit and deny, the most commonly used ACLs are of two forms. The first form of ACL is as follows:

if C1 then deny
if C2 then deny
. . .
if CN then deny
[otherwise] permit

In other words, for the first form the default action is "permit." The second form of ACL has the opposite default action, as follows:

if C1 then permit
if C2 then permit
. . .
if CN then permit
deny

Only the second form is considered acceptable from a security perspective, since it denies all unknown traffic, i.e., traffic that does not match conditions C1 through CN. Therefore, the second form of ACL is preferred for embodiments of the present invention. The conditions are membership of security groups, as determined by reading a packet's SGT. For example, if there are N security groups defined for enterprise network 110 and only packets from devices within security group 1 may access server 125, the egress filtering may be as follows:

if security group 1 then permit
[otherwise] deny

In other embodiments, a look-up table accessible by router 120 indicates which security groups are allowed to access server 125. The look-up table may be stored in a memory of router 120. In this example, the SGT of packet 107 would be read to determine that packet 107 is from a device within security group 1, the members of which are allowed to send packets to server 125. Therefore, packet 107 is transmitted to server 125.

In alternative embodiments, egress testing is performed using hardware, such as an array having at least as many bits as the number of possible security groups. In one such example, an SGT is formed using an 8-bit field, providing a range of possible security group values from 0 to 255. The corresponding hardware array used for egress testing could be a 256 bit array with an indication as to whether each of the possible security groups should, or should not, be allowed to access server 125. For example, a 1 could signify that a packet should be forwarded to server 125 and a 0 could signify that a packet should not be forwarded to server 125. Here, the field corresponding to security group 1 would contain a 1, indicating that packet 107 should be forwarded to server 125.

In a second example, host 105 sends packet 107 to the Internet 130. The SGT of packet 107 is checked at egress port 118 to determine whether packet 107 is authorized to reach the Internet 130. Because the SGT of packet host 105 indicates security group 1, the members of which are permitted to send packets to the Internet 130, packet 107 is transmitted to the Internet 130.

In a third example, host 105 attempts to send packet 107 to server 135. Packet 107 is forwarded from router 115 to router 120 based upon information encoded in layer 3 of packet 107, but not upon the SGT. The SGT of packet 107 is checked at egress port 127 to determine whether packet 107 is authorized to reach server 135. Because the SGT of packet host 105 indicates security group 1, the members of which are not permitted to send packets to the Internet 130, packet 107 is dropped.

In preferred and somewhat more sophisticated embodiments, all hosts in an enterprise network are assigned a "role." Simple examples of roles include authenticated host, unauthenticated host, secure server, and general server. The role of a host is identified by the SGT assigned to all packets originating from that host. The security or segregation within the enterprise network is enforced by routers that determine whether to forward packets to their ultimate destinations. This determination is made based on logic (typically a simple set of rules) that allows only packets displaying certain roles to be forwarded to the particular destinations.

Some destinations can receive packets only from network nodes having a particular role. Other destinations can receive packets from network nodes of many different roles. For example, a secure server might receive packets from authenticated hosts only, while a general server might receive packets from both authenticated and unauthenticated hosts. Using the SGTs of the packets, the routers decide whether to drop packets or transmit them to their ultimate destination. The allowed combinations of sources and destinations based on "role" effectively comprise security groups.

A similar implementation of security groups involves use of clearance levels, such as those described in RFC 1108. In this implementation, security groups are identified on the basis of the U.S. classification level at which a datagram is to be protected.

Figure 2:
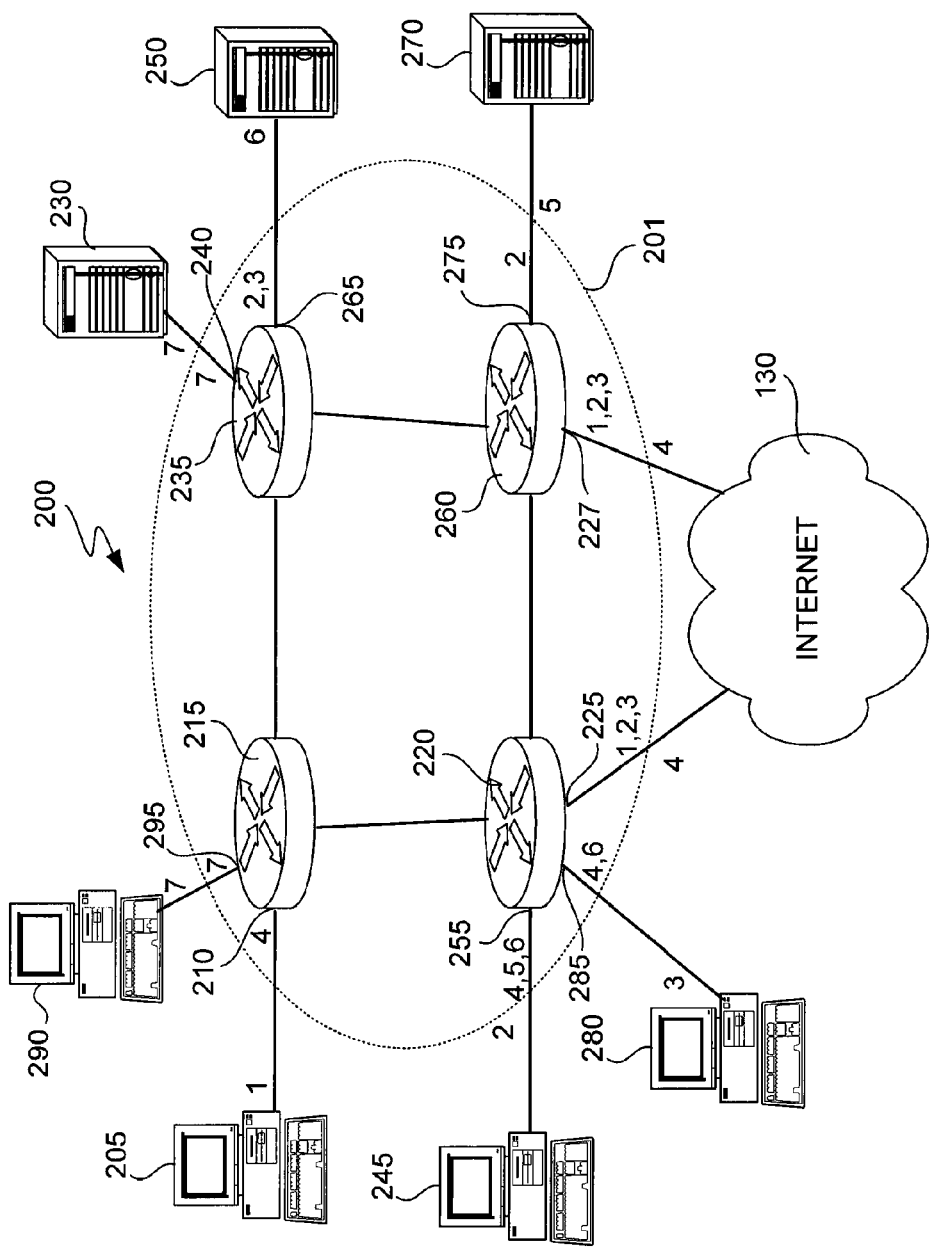
FIG. 2 depicts an enterprise network that implements a plurality of security groups.

FIG. 2 illustrates various types of security groups implemented on an enterprise network. In this example, there are seven different roles defined for security groups within enterprise network 200 and seven corresponding SGTs indicated on FIG. 2: 1 is for guests; 2 is for authenticated devices; 3 is for unauthenticated devices; 4 is for the Internet; 5 is for secure servers; and 6 is for regular servers. Number 7 is used for a closed security group, also known as a non-overlapping security group. As will be discussed in more detail below, all packets in a closed security group may be tagged with an SGT during ingress and all the packets are filtered on output based upon the same SGT.

In alternative embodiments, other roles may be assigned which correspond with SGTs. For example, a default SGT=0 may be made available for non-classified packets. In other embodiments, roles are assigned to users or applications instead of devices. In yet other embodiments, SGTs correspond with other attributes, such as distinctions of service quality (e.g., QoS) between members of a security group.

In FIG. 2, the single-digit numbers inside oval 201 are SGTs used for egress filtering and the numbers outside oval 201 are SGTs used for ingress tagging. Visitor device 205 is configured for use by a person without authority to access information from other classes of network nodes on enterprise network 200. Therefore, packets sent from visitor device 205 are tagged with SGT=1, which corresponds to guests in this example. Although the SGT could be applied by visitor device 205, it is preferably applied after a packet from visitor device 205 is received at port 210 of router 215.

Packets marked in this way can only egress enterprise network 200 toward the Internet 130, because the egress filters of ports 225 and 227, which connect enterprise network 200 to the Internet, are the only egress filters which will pass a packet with an SGT of 1. Similarly, visitor device 205 can only receive packets having an SGT of 4, which is assigned to packets that reach port 225 or port 227 from Internet 130.

Authenticated device 245 has its packets tagged with SGT=2, preferably after reaching port 255 of router 220. Accordingly, authenticated device 245 can send packets to Internet 130, to regular server 250 and to secure server 270, because ports 225, 227, 265 and 275 will pass packets having an SGT of 2. Authenticated device 245 can receive packets from Internet 130, from regular server 250 and secure server 270, because port 255 will pass SGTs of 4, 5 or 6.

Unauthenticated device 280 has its packets tagged with SGT=3, preferably after reaching port 285 of router 220. Accordingly, unauthenticated device 280 can send packets to Internet 130 and to regular server 250, because ports 225, 227 and 265 will pass packets having an SGT of 3. Unauthenticated device 280 can receive packets from Internet 130 and from regular server 250, because port 285 will pass SGTs of 4 or 6.

Note that regular server 250 may receive packets from, and send packets to, unauthenticated device 280 or authenticated device 245. This is an example of partially overlapping security groups.

FIG. 2 also shows an example of a closed security group that includes host device 290 and server 230. In this example, an SGT of 7 is encoded on packets sent from host device 290 to port 295 of router 215. When such packets arrive at router 235, port 240 allows them to be transmitted to server 230. Similarly, packets from server 230 also are tagged with an SGT of 7 prior to being forwarded from router 235 to router 215. When such packets arrive at router 215, port 295 allows them to be transmitted to host device 290. This example illustrates the point that a closed security group needs only a single SGT.

Figure 7:
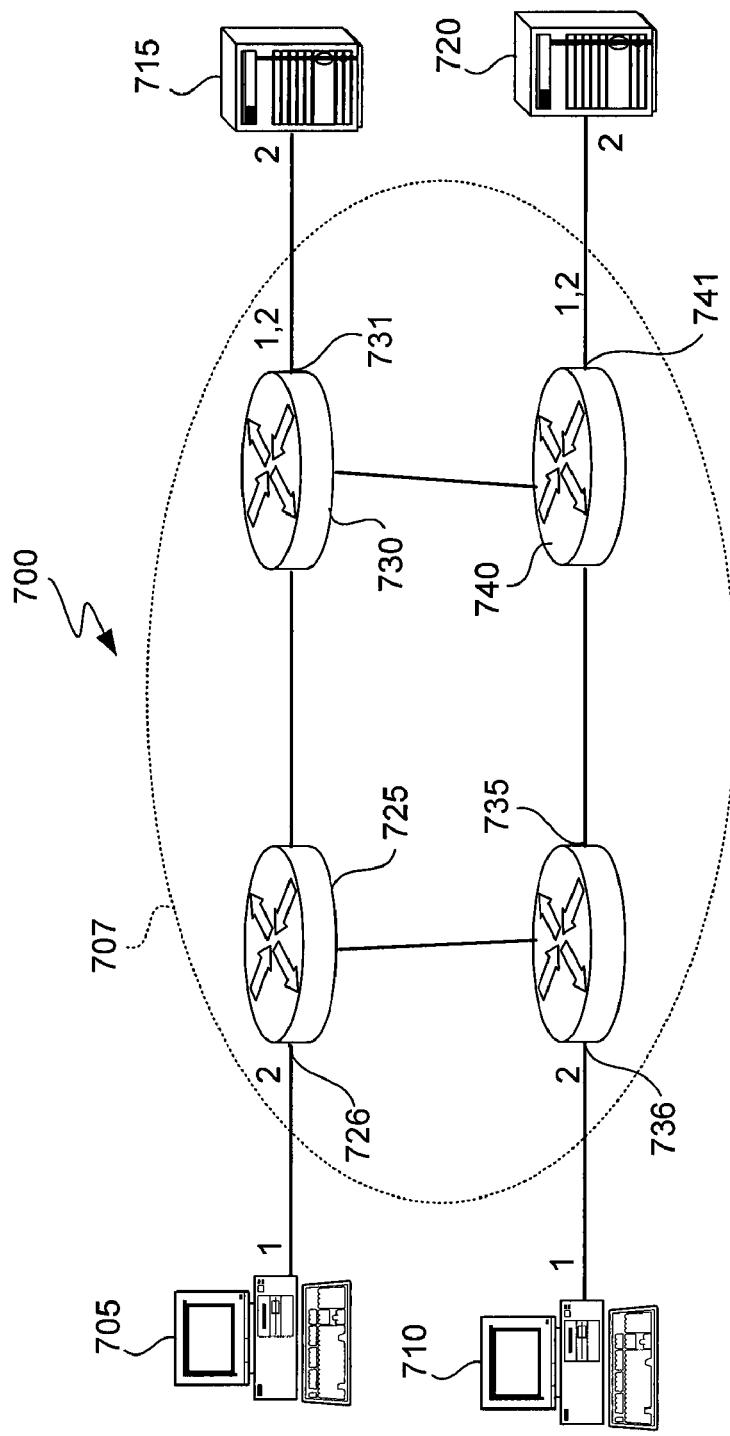
FIG. 7 depicts an enterprise network that implements a private security group according to one embodiment of the present invention.

FIG. 7 illustrates a private security group implemented on enterprise network 700 according to an embodiment of the invention. In a private security group, a group of client devices may communicate with a group of servers, but the client devices cannot communicate with each other. This result can be achieved by using one SGT to tag packets originated by the servers and one SGT to tag packets originated by the client devices. The single-digit numbers inside oval 707 are SGTs used for egress filtering and the numbers outside oval 707 are SGTs used for ingress tagging.

For example, packets sent by client device 705 and client device 710 receive an SGT of 1 at ports 726 and 736, respectively. A packet from client device 705 is forwarded from router 725 to router 730, where port 731 passes the packet to server 715. A packet from client device 710 is forwarded from router 735 to router 740, where port 741 passes the packet to server 720.

Similarly, packets sent by server 715 and server 720 receive an SGT of 2 after being transmitted to port 731 of router 730 and port 741 of router 740, respectively. Router 730 forwards packets from server 715 to router 725, 735 or 740, depending on the ultimate destination of the packets. Router 740 forwards packets from server 720 to router 725, 730 or 735, depending on the ultimate destination of the packets.

Because ports 731 and 741 will pass packets having SGTs of either 1 or 2, servers 715 and 720 may receive packets from any other device in the private security group. However, because ports 726 and 736 will pass only those packets having SGTs of 2, client device 705 and client device 710 can receive packets from either of servers 715 and 720, but not from each other.

Figure 8:
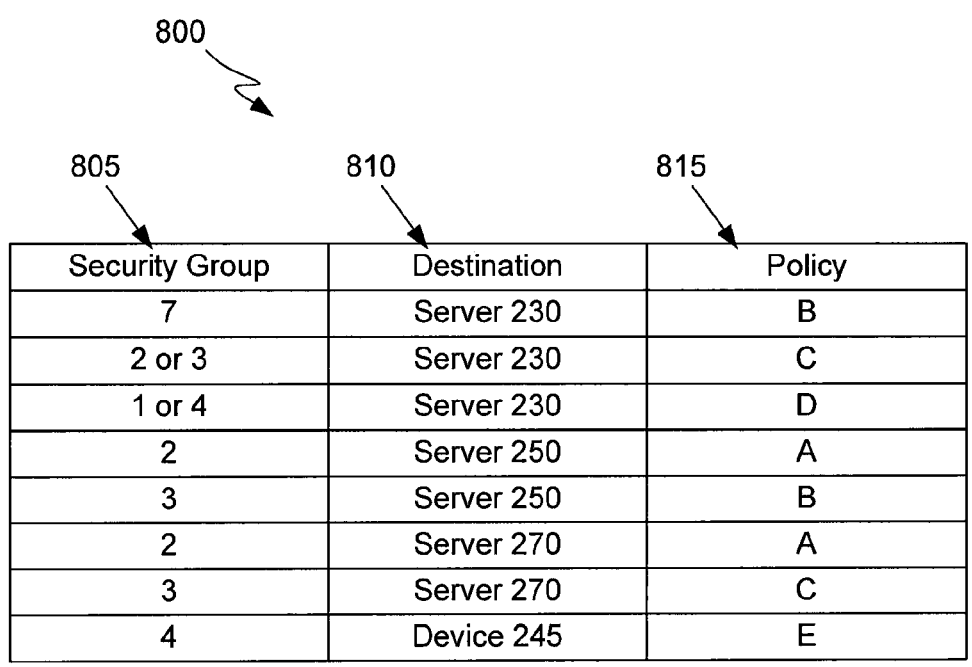
FIG. 8 is a table that provides an example of applying policies according to some aspects of the invention.

FIG. 8 depicts table 800, which provides an example of applying policies according to some aspects of the invention. Table 800 illustrates only a subset of the possible combinations of security groups 805 and destinations 810 applicable to the system described above with reference to FIG. 2. Moreover, the policies described below are merely illustrative of the wide range of policies that could be implemented according to various aspects of the invention. The data of table 800 could be stored, e.g., in any convenient memory accessible to the egress ports depicted in FIG. 2.

In this example, policies 815 are as follows: policy A is to forward a packet; policy B is to forward the packet and log the event (i.e., make a record that the packet was forwarded to the destination); policy C is to drop the packet; policy D is to drop the packet and log the event; and policy E is to inspect the packet and determine, based on factors in addition to the security group, what should be done with the packet. Policies 815 could be applied in a variety of ways, e.g., by access control list ("ACL") commands.

If a packet indicating security group 7 having server 230 as its destination is received by egress port 240, policy B will be enforced: port 240 will forward the packet to server 230 and the event will be logged. If a packet having server 230 as its destination indicates an SGT of 2 (authenticated devices) or 3 (unauthenticated devices), the packet will be dropped. If a packet from a guest (SGT=1) or Internet 130 (SGT=4) having server 230 as its destination is received by egress port 240, the packet will be dropped and the event will be logged: these events could be attempts to "hack" into closed security group 7.

If a packet having an SGT of 2 and a destination of server 250 is received by port 265, the packet will be forwarded to server 250. If port 265 receives a packet having an SGT of 3 and a destination of server 250, the packet will be forwarded and the event will be logged.

If a packet having an SGT of 2 and a destination of server 270 is received by port 275, the packet will be forwarded to server 270. However, if port 275 receives a packet having an SGT of 3 and a destination of server 270, the packet will be dropped.

In this example, if a packet having an SGT of 4 (originating from Internet 130) and a destination of device 245 is received by port 255, the port will apply policy E. Accordingly, other fields of the packet will be inspected to determine its disposition. For example, packets from Internet 130 that include content from certain URLs (e.g., URLs known to be associated with pornography, with illegal file sharing applications, etc.) could be dropped and others could be forwarded as part of a content filtering method. Such content filtering methods could include parental control filtering based on sexual or violent content. In other examples, policy E could be used to implement a "Spam" filter, an anti-virus filter, or to screen out packets in excess of a predetermined size.

FIGS. 3 through 6B illustrate various types of packets including security group tags or SGTs according to the present invention. The types of packets shown and the positioning of the SGT in each packet are purely illustrative. According to various embodiments, a SGT may have different formats, be written into different parts of a packet, or require a field having varying numbers of bits.

For example, an SGT may require 8 bits, 16 bits or some other number of bits (for example, 32, 64 or 128). In some embodiments, a field is reserved for an SGT that is larger than currently required, to allow for more complex embodiments in the future and also to address the fact that in a large corporation, the group space may get divided up among the various divisions causing block allocation, which is notoriously inefficient. For example, some such embodiments reserve 16 bits for the SGT, use 8 bits for encoding an SGT and reserve another 8 bits for future expansion, preferably with a mechanism that avoids aliasing. Other embodiments reserve 32 bits for the SGT, use 16 for encoding a current SGT and reserve 16 bits.

In some such embodiments, the SGT is used as an index into a bit vector that contains the decision to forward or drop the packet. In other embodiments, a first portion of the field reserved for the SGT is used as an index into a bit vector that contains the decision to forward or drop the packet and a second portion of the field is used as a classification level. The classification level is checked with a magnitude comparison.

Figure 3:
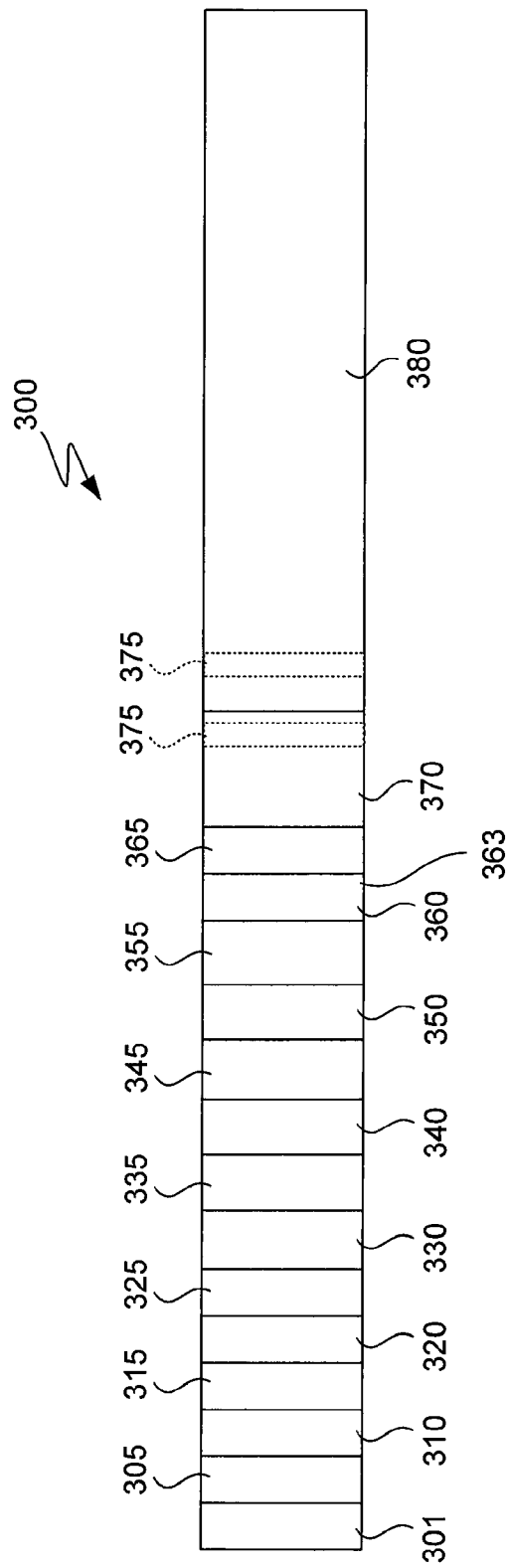
FIG. 3 illustrates the format of an ISO data packet, including a security group tag.

FIG. 3 illustrates the format of an ISO level 3 data packet, formally known as an 8473 PDU Frame. Packet 300 includes field 301, which identifies the protocol as ISO 8473 in this example. Field 305 describes the length of packet 300's header and version ID 310 indicates the version of the protocol indicated in protocol identifier 301. Field 315 indicates the packet's lifetime. Field 320 is used for various purposes, including error reports and a statement of whether the packet is segmented.

Field 325 states the length of a segment, including header and data or "payload." Field 330 is a checksum, calculated on the entire header. Field 335 indicates the length of the destination address and field 340 states the destination address. Similarly, field 345 indicates a source address length and field 350 states the source address. Field 350 identifies an initial segment of the packet and field 360 describes the position of a subsequent segment in relation to the initial segment. Field 365 indicates the packet length.

Field 370 is reserved for optional parameters such as route recording, quality of service and designation of security levels. Accordingly, in some embodiments of the present invention, SGT 375 is formed within field 370. Field 380 is reserved for the data payload. According to another aspect of the present invention, SGT 375 is formed within payload 380.

Figure 4:
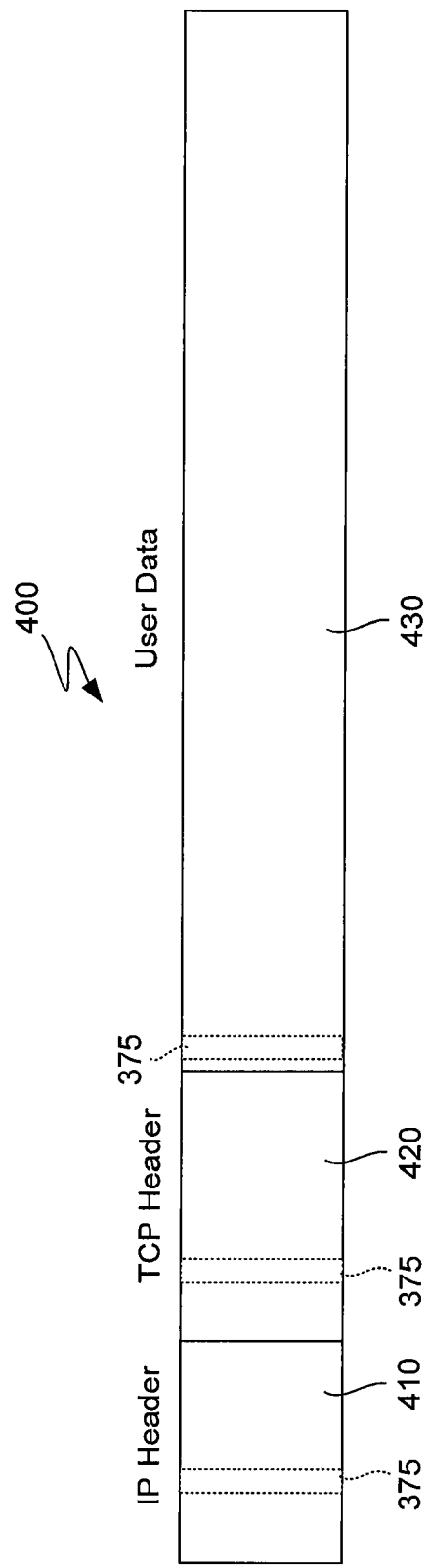
FIG. 4 illustrates the format of a TCP/IP data packet, including a security group tag.

FIG. 4 illustrates a simplified version of TCP/IP data packet 400, which includes IP header 410, TCP header 420 and data payload 430. As indicated in FIG. 4, SGT 375 may be formed within IP header 410, TCP header 420 or data payload 430. Although SGT 375 is shown in phantom within P header 410, TCP header 420 and data payload 430, in most embodiments SGT 375 would be encoded in only one of these locations.

Figure 5:
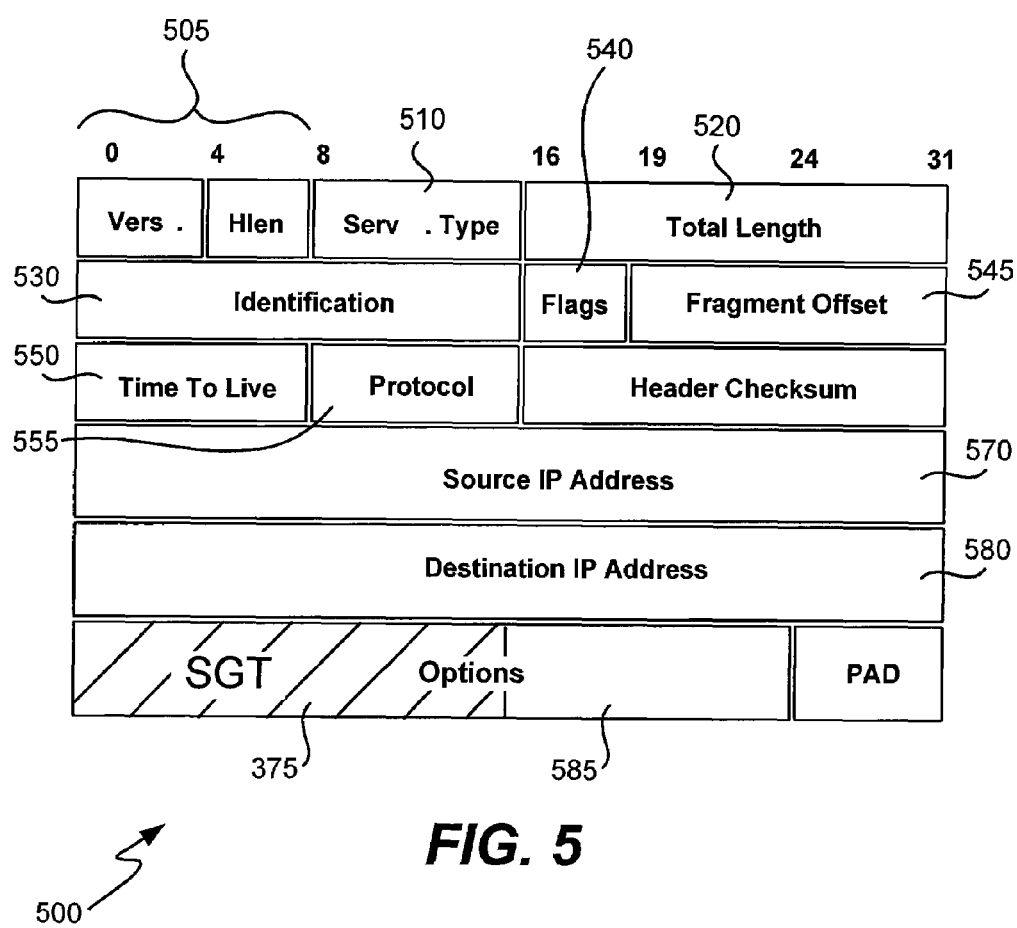
FIG. 5 illustrates the format of an IP data packet header, including a security group tag.

FIG. 5 illustrates the details of IP header 500, which includes SGT 375 according to one embodiment of the present invention. Field 505 indicates the version and header length. Field 510 states the type of service and field 520 indicates the total packet length. Field 530 is a two-byte field reserved for identification purposes.

Field 540 is reserved for flags and field 545 is reserved for information regarding the offset of packet fragments. Field 550 indicates the packet's lifetime and field 555 states a protocol. Field 560 is a checksum field. Field 570 indicates a source IP address and field 580 states a destination IP address. Field 585 is an option field within which SGT 375 is disposed in this embodiment.

Figure 5A:
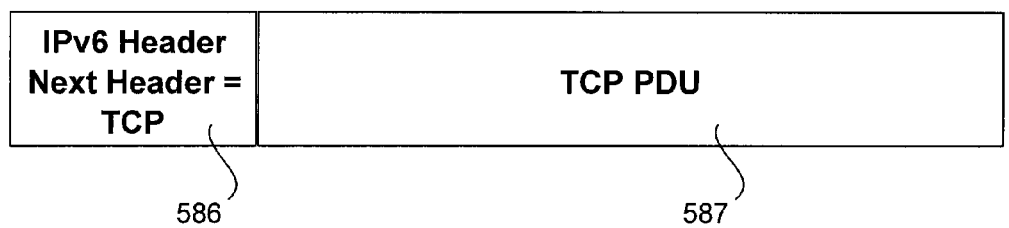
FIG. 5A illustrates the format of a portion of an IPv6 header.
Figure 5B:
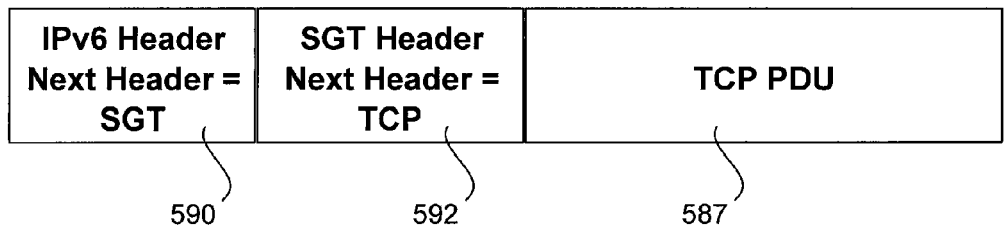
FIG. 5B illustrates the format of a portion of an IPv6 header with a security group tag.

FIGS. 5A and 5B illustrate a portion of an Internet Protocol version 6 ("IPv6") header before and after modification to include a security group tag. FIG. 5A illustrates a simplified IPv6 header, wherein next header field 586 indicates that the next header will be a TCP header. As is known to those of skill in the art, a next header field indicates the next encapsulated protocol. This is appropriate for the situation depicted in 5A, wherein the next field is TCP PDU 587.

The IPv6 header depicted in FIG. 5B includes SGT field 592. Accordingly, next header field 590 indicates that the next protocol will be that of SGT field 592, which contains a security group tag. SGT field 592 also indicates that the next header will be the TCP header of TCP PDU 587. In alternative embodiments, an SGT may be encoded in the IPv6 hop by hop option header or the destination option header.

Figure 6:
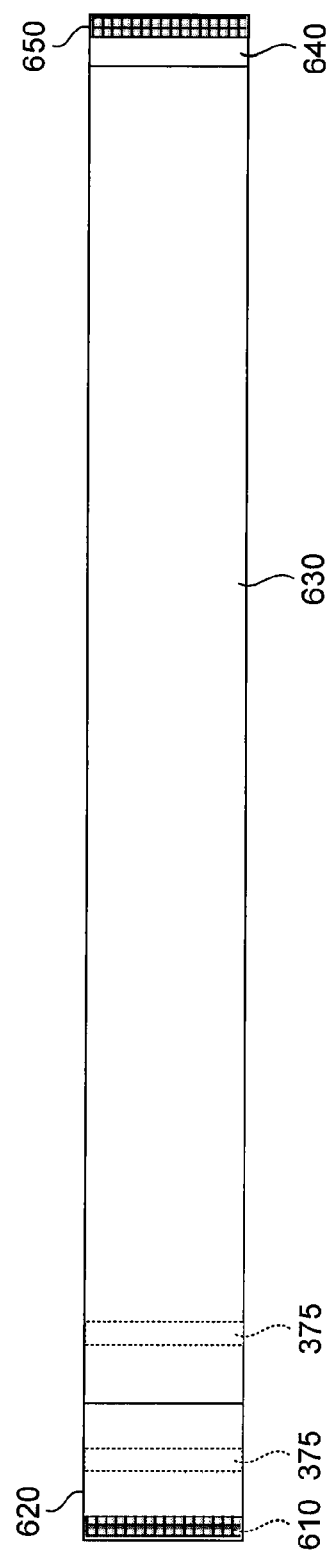
FIG. 6 illustrates the format of a Fiber Channel data packet, including a security group tag.

FIG. 6 is a simplified depiction of a Fiber Channel packet that includes SGT 375 according to one embodiment of the invention. Field 610 is a start of frame delimiter and field 620 is a header. Start and end of frame delimiters are used because Fiber Channel packets have a variable length. Field 630 is a variable-length data payload. Field 640 is a cyclic redundancy check (CRC) field and field 650 is an end of frame delimiter. SGT 375 may be formed within header field 620, within payload 630 or within an extended header In alternative embodiments, the SGT may be located in an Extended Inter-Switch Link ("EISL") frame, e.g., in the EISL header. It is also possible to have an SGT in an external security header that precedes either the EISL or the FC header.

Figure 6A:
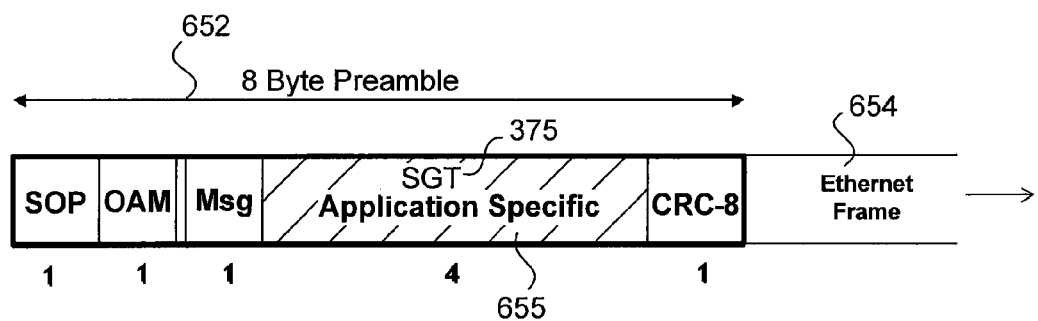
FIG. 6A illustrates a preamble of an Ethernet frame.

FIG. 6A illustrates one example of disposing an SGT in an Ethernet frame. Here, an 8 byte preamble 652 precedes Ethernet frame 654. FIG. 6A indicates a possible redefinition of preamble 652 in which 4 bytes form application specific field 655, which can contain SGT 375.

Figure 6B:
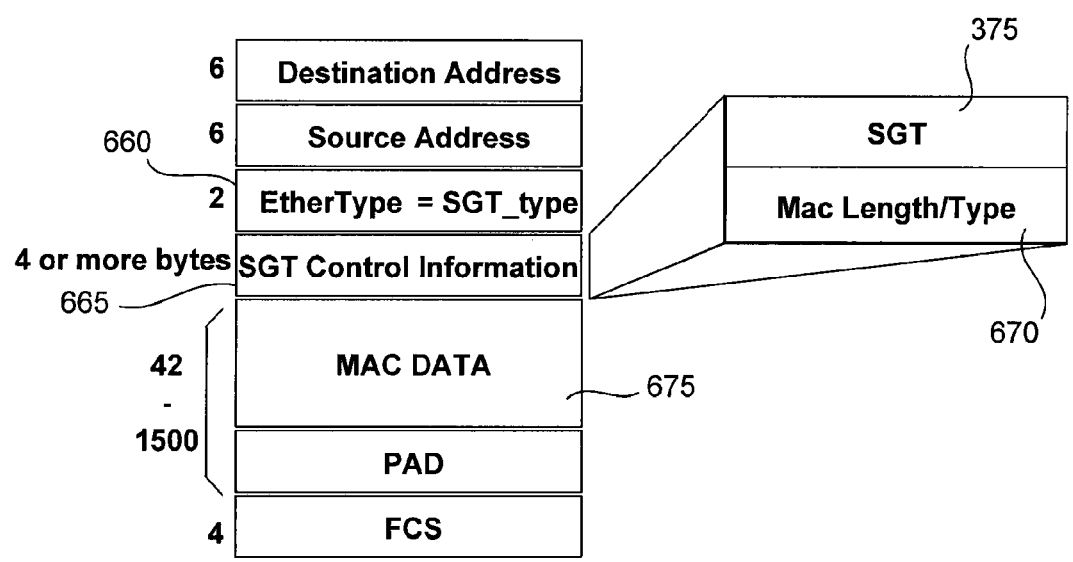
FIG. 6B illustrates a portion of an Ethernet frame.

FIG. 6B illustrates a portion of an Ethernet frame which has been modified according to another aspect of the present invention. Here, field 660 defines a new Ethernet protocol type that indicates an SGT. The next field is SGT Control Information field 665, which includes SGT 375 and field 670. Field 670 indicates the length and type of data in the following field, which is MAC data field 675.

As indicated in the preceding discussion, important aspects of the invention are typically implemented by ports of routers located at the boundary of a secure cloud within a network. Moreover, encryption and decryption of packets may be performed for each "hop" between routers in the network. For example, a packet may be encrypted by a transmitting port of a first router in the network and decrypted by a receiving port of a second router. A transmitting port of the second router may re-encrypt the packet and a receiving port of a third router may decrypt the packet, and so on. The ingress and egress ports connect directly to source and destination hosts. The direct connection is typically a physical connection such as wire or wireless link. Hence, aspects of the invention are typically implemented in routers deployed (or to be deployed) at the boundary of an enterprise network.

As indicated, routers, switches and other network devices that typically handle packet forwarding implement the present invention. These devices have ports (network interfaces) designed to handle the type(s) of traffic that flows on the network, be it Ethernet, ATM, Sonet and Fibre Channel, etc. Understand that conventional computing devices such as workstations may be outfitted with network interfaces and network processing capabilities that allow them to implement the present invention. The network ports used with this invention may be fixed in the network devices or be implemented as removable line cards configured to handle specific types of traffic. Alternatively, they may be provided in racks in large high-speed switches. Further, the ports may include processors to handle various network tasks including, optionally, the ingress and egress security group filtering. In other embodiments, the ports have no dedicated processors, or if they do, those processors do not handle the security group functions of this invention. In such cases, a central processor in the network device implements security group control.

In addition to having one or more ports and one or more processors that communicate with the ports and execute functions required to implement this invention, the apparatus of this invention may also include one or more memory devices coupled to the relevant processor(s). Such devices can store instructions for performing the operations of this invention. Thus, embodiments of the present invention relate to computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The network devices of this invention typically store some information allowing them to apply appropriate SGTs at ingress ports and/or filter packets possessing particular SGTs at egress ports. Such information may be stored in the form of lists, tables, databases, etc.

Note that the routers that implement this invention typically forward packets from and to various other points in the network. They may employ various forwarding protocols such as layer 3 routing and layer 2 switching. Importantly, in making forwarding decisions, these devices generally do not rely on the SGTs used in this invention. Rather, to determine where to send a packet/frame on the next hop, the router considers the source and destination identifiers required for conventional forwarding decisions (e.g., source and destination IP addresses and port numbers). While such devices do use the SGTs to filter traffic before transmitting to a given destination end node, preferred embodiments do not use the SGTs to determine where to forward the packet next.

As indicated, the invention provides particular value when used to secure sensitive network resources, by preventing some internal hosts from accessing those resources. The invention can have other applications however. For example, it can enforce quality of service (QoS) levels for the various nodes on the network. Different SGTs may indicate different QoS levels. Depending on traffic volume, bandwidth availability, network jitter, etc., the egress ports can choose to transmit (i) packets bearing certain SGTs immediately, (ii) other packets bearing other SGTs on a delayed basis, and (iii) still other packets bearing still other SGTs never.

While routers at a network boundary are largely or wholly responsible for implementing the security groups of this invention, other nodes, notably the source hosts may, in some embodiments, also participate in a limited manner. Specifically, they may be designed or configured to create packets having SGTs in appropriate fields as illustrated above. In such cases, a fabric network node at the ingress point may check to confirm that the incoming packet has an authorized SGT.

While the invention has been particularly shown and described with reference to specific embodiments thereof, it will be understood by those skilled in the art that changes in the form and details of the specific embodiments may be made without departing from the spirit or scope of the invention. For example, an SGT may be formed not only in the types of packets discussed herein, but in any sort of packet which is routed using fields which are equivalent to layer 3 or higher of the OSI protocol.

Moreover, the subject invention has wide applicability to other media, such as synchronous optical networks ("SO-NETs). For example, an SGT may be formed in the transport overhead or the synchronous payload envelope of an STS frame. In addition, the subject invention may be implemented in networks which have wireless components, for example wireless networks constructed according to the IEEE 802.11 standard.

Moreover, in some embodiments, an SGT will be altered by certain devices such as a firewall or a VPN terminator. For example, the SGT may be changed when the device does a deeper inspection of traffic or when there is a need to map SGTs between different enterprise networks. In some such embodiments, the SGT is set (or altered) according to a deeper level of packet inspection performed by a stateful inspection entity.

In yet other embodiments, ports other than an egress port may have the ability to discard packets that have (or do not have) certain SGTs. For example, each port on the path traversed by the packet may be able to discard such packets. Alternatively, each port in a designated section of an enterprise network may be able to discard such packets. This feature is useful for creating a higher level of security for the entire enterprise network or a portion of the network, e.g., to allow only packets tagged with certain SGTs to enter or exit a given boundary.

In still other embodiments, the same SGT may be accepted if received on a first path, but discarded if received on a second path. This feature is useful, for example, if certain sections of the enterprise network are more trusted than others.

Some aspects of the invention may be implemented with a "destination resource group" that does not require an SGT in the packet. For example, the egress network device may group policies that are common for a set of destinations, for example by grouping the destination in a "destination resource group." In a more complex scheme, the egress switch maps the destinations into multiple destination groups and then concatenates together the SGT with the destination group and uses it to select a policy. Then, the policy is applied as described above.

We claim:

1. A method of implementing a security group within a network, the method comprising:
   receiving a packet at an ingress port of a first router that forms a first edge of a cloud of routers in an enterprise network;
   classifying the packet at the ingress port as having a security group designation selected from a plurality of security group designations, the security group designation associating a set of destinations and a set of sources authorized to access the set of destinations;
   applying a security group tag to the packet at the ingress port, the security group tag identifying the security group designation and the security group tag being applied in a field not reserved for virtual local area network information;
   transmitting the packet from the ingress port to the egress port of a second router only via routers in the cloud of routers of the enterprise network, the second router forming a second edge of the cloud of routers; and
   determining, based at least in part on the security group tag and at the egress port, whether the packet should be transmitted to a device.

2. The method of claim 1, wherein the security group tag is applied in a field reserved for layer one.

3. The method of claim 1, wherein the security group tag is applied in a field reserved for layer two.

4. A method of implementing a security group within a network, the method comprising:
   receiving a packet at an ingress port of a first router that forms a first edge of a cloud of routers of an enterprise network;
   classifying the packet at the ingress port as having a security group designation selected from a plurality of security group designations, the security group designation associating a set of destinations and a set of sources authorized to access the set of destinations; and
   applying a security group tag to the packet at the ingress port, the security group tag identifying the security group designation and the security group tag being applied in a field reserved for security group information;
   transmitting, without reference to the security group tag, the packet from the ingress port to the egress port of a second router only via routers in the cloud of routers of the enterprise network, the second router forming a second edge of the cloud of routers; and
   determining, based at least in part on the security group tag and at the egress port, whether the packet should be transmitted to a device.

5. The method of claim 4, wherein the security group tag is applied in a field reserved for layer one.

6. The method of claim 4, wherein the security group tag is applied in a field reserved for layer two.

7. A method for implementing a security group within a network, the method comprising:
   receiving a first packet;
   classifying the first packet as having a first security group designation selected from a plurality of security group designations, wherein the first security group designation associates a first set of destinations and a first set of sources authorized to access the first set of destinations; and
   applying, at an ingress port of a first router that forms a first edge of a cloud of routers of an enterprise network, a first security group tag to the first packet which identifies the first security group designation;
   transmitting the first packet from the ingress port to the egress port of a second router only via routers configured to implement security group policies of the enterprise network, the second router forming a second edge of the cloud of routers; and
   determining, based at least in part on the security group tag and at the egress port, whether the packet should be transmitted to a device.

8. The method of claim 7, further comprising providing authentication information in the first packet.

9. The method of claim 7, further comprising encrypting the first security group tag.

10. The method of claim 7, further comprising:
    receiving a second packet;
    classifying the second packet as having a second security group designation selected from the plurality of security group designations, wherein the second security group associates a second set of destinations and a second set of sources authorized to access the second set of destinations; and
    applying, at the ingress port, a second security group tag to the packet which identifies the second security group designation.

11. The method of claim 7, wherein the receiving step comprises receiving the packet directly from a source node.

12. The method of claim 7, wherein the classifying step comprises classifying the packet based on a source identity.

13. The method of claim 7, wherein the classifying step comprises classifying the packet based on a payload content.

14. The method of claim 7, further comprising:
    (a) receiving a second packet having a second security group tag identifying a particular security group within the enterprise network;
    (b) based on the security group identified in the second security group tag, determining whether to transmit the second packet to its intended destination; and
    (c) transmitting the second packet or denying transmission of the second packet to the intended destination based on the determination in (b).

15. The method of claim 10, wherein the second set of sources comprises a source that is included in the first set of sources.

16. The method of claim 10, wherein the second set of destinations comprises a destination that is included in the first set of destinations.

17. The method of claim 12, wherein the source identity comprises a user identity.

18. An apparatus for implementing a security group within an enterprise network, the apparatus comprising:
    means for receiving a first packet at an ingress port of a first router that forms a first edge of a cloud of routers of an enterprise network;
    means for classifying the first packet at the ingress port as having a first security group designation selected from a plurality of security group designations, wherein the first security group designation associates a first set of destinations and a first set of sources authorized to access the first set of destinations; and means for applying a first security group tag to the first packet at the ingress port, the first security group tag identifying the first security group designation; and means for transmitting the first packet from the ingress port to the egress port of a second router only via routers in the cloud of routers of the enterprise network, the second router forming a second edge of the cloud of routers; and means for determining, based at least in part on the security group tag and at the egress port, whether the packet should be transmitted to a device.

19. An apparatus for implementing a security group within an enterprise network, the apparatus comprising:

at least one port for receiving a first packet and a second packet at a first router of a cloud of routers of an enterprise network, the second packet including a second security group tab;

at least one processor for:

establishing whether the receiving of the first packet at the first router caused the first packet to ingress the cloud of routers of the enterprise network;

determining, based at least in part on the establishing step, whether to classify the first packet and apply a first security group tag to the first packet;

ascertaining a location to which the second packet will next be forwarded;

assessing whether forwarding the second packet to the location will cause the second packet to egress the cloud of routers of the enterprise network; and deciding, based at least in part on the assessing step, whether to reference the second security group tag in the second packet.

20. A computer program embodied in a computer-readable storage medium, the computer program comprising instructions which cause a network device to:

receive a first packet at an ingress port of a first router that forms a first edge of a cloud of routers of a enterprise network;

classify the first packet at the ingress port as having a first security group designation selected from a plurality of security group designations, wherein the first security group designation associates a first set of destinations and a first set of sources authorized to access the first set of destinations;

apply a first security group tag to the first packet at the ingress port, the first security group tag identifying the first security group designation, wherein the first security group tag is applied in a field reserved for layer three or higher transmit the packet from the ingress port to the egress port of a second router only via routers in the cloud of routers of the enterprise network, the second router forming a second edge of the cloud of routers; and determine, based at least in part on the security group and tag at the egress port, whether the packet should be transmitted to a device.

21. A method for implementing a security group within an enterprise network, the method comprising:

receiving a packet at an egress port of a router that forms an edge of a cloud of routers of an enterprise network;

verifying a source of the packet;

reading a destination address of the packet;

reading a security group tag in a field of the packet;

determining a first security group of the packet based on the security group tag, wherein the first security group is one of a plurality of security groups and wherein the first security group associates a first set of destination addresses and a first set of sources authorized to access the first set of destination addresses; and deciding, based upon the source and the first security group designation, whether to transmit the packet to the destination address.

22. The method of claim 21, wherein the step of verifying the source of the packet comprises authenticating a source by analyzing authentication information in the packet.

23. The method of claim 21, wherein the step of verifying the source of the packet comprises authenticating a user by analyzing authentication information in the packet.

24. The method of claim 21, further comprising the step of decrypting the packet.

25. The method of claim 21, wherein the first security group is a closed group.

26. The method of claim 21, wherein the first security group is a partially overlapping group.

27. The method of claim 21, further comprising:

receiving a second packet;

classifying the second packet as having a second security group designation selected from a plurality of security group designations, wherein the second security group designation associates a second set of destinations and a second set of sources authorized to access the second set of destinations; and applying a second security group tag to the second packet which identifies the second security group designation, wherein the second security group tag is applied in a field reserved for layer three or higher and wherein the information in the field is not used in forwarding decisions.

28. The method of claim 21, further comprising the step of applying a policy to the packet based upon the first security group and the destination address, wherein the policy is selected from the group of actions consisting of: forwarding the packet; forwarding the packet and making a record of forwarding the packet; dropping the packet; dropping the packet and making a record of dropping the packet; and inspecting other fields of the packet to determine how to dispose of the packet.

29. A computer program embodied in a computer-readable storage medium, the computer program comprising instructions which cause a network device to:

receive a packet at an egress port of a router that forms an edge of a cloud of routers of an enterprise network;

verify a source of the packet;

read a destination address of the packet;

read a security group tag in a field of the packet reserved for layer three or higher; determine a first security group of the packet based on the security group tag, wherein the first security group is one of a plurality of security groups and wherein the first security group associates a first set of destination addresses and a first set of sources authorized to access the first set of destination addresses; and decide, based upon the source and the first security group designation, whether to transmit the packet to the destination address.

30. An apparatus for implementing a security group within a network, the apparatus comprising:

means for receiving a packet at an egress port of a router that forms an edge of a cloud of routers of an enterprise network;

means for verifying a source of the packet;

means for reading a destination address of the packet and for reading a security group tag in a field of the packet reserved for layer three or higher; and means for determining a first security group of the packet based on the security group tag, wherein the first security group is one of a plurality of security groups and wherein the first security group associates a first set of destination addresses and a first set of sources authorized to access the first set of destination addresses and for deciding, based upon the source and the first security group designation, whether to transmit the packet to the destination address.

31. An apparatus for implementing a security group within a network, the apparatus comprising:

a port for receiving a packet, the port being an egress port of a router that forms an edge of a cloud of routers of an enterprise network; and a processor for:

verifying a source of the packet;

reading a destination address of the packet;

reading a security group tag in a field of the packet reserved for layer three or higher;

determining a first security group of the packet based on the security group tag, wherein the first security group is one of a plurality of security groups and wherein the first security group associates a first set of destination addresses and a first set of sources authorized to access the first set of destination addresses and deciding, based upon the source and the first security group designation, whether to transmit the packet to the destination address.

32. A method of implementing a security group in an enterprise network having a plurality of security groups, wherein the security groups each include multiple network nodes within the enterprise network, and wherein the network nodes within a security group are subject to rules governing which network nodes they can communicate with, the method comprising:

(a) receiving a packet at an egress port of a router that forms an edge of a cloud of routers of an enterprise network, the packet having a security group tag identifying a particular security group within the enterprise network, wherein the field is not used in forwarding decisions;

(b) based on the security group identified in the security group tag, determining whether to transmit the packet to its intended destination; and (c) transmitting the packet or denying transmission or delaying transmission of the packet to the intended destination based on the determination in (b).

33. The method of claim 32, wherein the method is implemented on a switch.

34. The method of claim 32, wherein (c) comprises transmitting the packet only if the security group tag has a specified value.

35. The method of claim 32, wherein the router:

(i) resides in a local area network (LAN) of a multi-LAN enterprise network, and (ii) physically connects, directly, to a host.

36. The method of claim 32, further comprising the step of applying a policy to the packet based upon the security group and the intended destination, wherein the policy is selected from the group of actions consisting of: forwarding the packet; forwarding the packet and making a record of forwarding the packet; dropping the packet; dropping the packet and making a record of dropping the packet; and inspecting other fields of the packet to determine how to dispose of the packet.

37. The method of claim 34, wherein (c) effects a level of service constraint, and wherein different security groups correspond to different levels of service.

38. A computer program embodied in a computer-readable storage medium for implementing a security group in an enterprise network having a plurality of security groups, wherein the security groups each include multiple network nodes within the enterprise network, and wherein the network nodes within a security group are subject to rules governing which network nodes they can communicate with, the computer program comprising instructions which cause a network device to:

(a) receive a packet at an egress port of a router that forms an edge of a cloud of routers of an enterprise network, the packet having a security group tag identifying a particular security group within the enterprise network, wherein the security group tag is provided in a field of the packet containing layer 3 or higher information, and wherein the field is not used in forwarding decisions;

(b) based on the security group identified in the security group tag, determine whether to transmit the packet to its intended destination; and (c) transmit the packet or deny transmission or delay transmission of the packet to the intended destination, based on the determination in (b).

39. The computer program of claim 38, wherein the computer program is implemented on a switch.

40. The computer program of claim 38, wherein (c) comprises transmitting the packet only if the security group tag has a specified value.

41. The computer program of claim 38, wherein the router:

(i) resides in a local area network (LAN) of a multi-LAN enterprise network, and (ii) physically connects, directly, to a host.

42. The computer program of claim 40, wherein (c) effects a level of service constraint and wherein different security groups correspond to different levels of service.

43. The method of claim 1, wherein the device is within the enterprise network.

44. The method of claim 1, wherein the device is outside the enterprise network.

45. The method of claim 7, further comprising ascertaining, at an egress port of a second router that forms a second edge of the cloud of routers of the enterprise network, whether the packet should be transmitted to a device, the ascertaining step being based, at least in part, on the first security group tag.

46. The apparatus of claim 18, wherein the first and second routers are selected from a group consisting of a conventional router, a switch, a bridge, an intermediate system and a wireless access point.

47. The apparatus of claim 19, wherein the first and second routers are selected from a group consisting of a conventional router, a switch, a bridge, an intermediate system and a wireless access point.

48. The computer program of claim 20, wherein the first and second routers are selected from a group consisting of a conventional router, a switch, a bridge, an intermediate system and a wireless access point.

49. The method of claim 1, wherein the device is within the enterprise network.

50. The method of claim 1, further comprising sending the packet at least in part via a tunnel to the device.

51. The apparatus of claim 19, further comprising:
- an encoder for applying the first security group tag to the first packet, the first security group tag identifying the first security group designation,
- wherein the processor is further configured for classifying the first packet as having a first security group designation selected from a plurality of security group designations, wherein the first security group designation associates a first set of destinations and a first set of sources authorized to access the first set of destinations.

* * * * *